(12) United States Patent
Sen

(10) Patent No.: US 12,236,474 B2
(45) Date of Patent: *Feb. 25, 2025

(54) EMBEDDED PAYMENT TOKENS IN DIGITAL MEDIA OBJECTS

(71) Applicant: VISA INTERNATIONAL SERVICE ASSOCIATION, San Francisco, CA (US)

(72) Inventor: Animikh Sen, Atlanta, GA (US)

(73) Assignee: VISA INTERNATIONAL SERVICE ASSOCIATION, San Francisco, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/105,347

(22) Filed: Feb. 3, 2023

(65) Prior Publication Data

US 2023/0177596 A1 Jun. 8, 2023

Related U.S. Application Data

(63) Continuation of application No. 16/979,692, filed as application No. PCT/US2018/022390 on Mar. 14, 2018, now Pat. No. 11,587,157.

(51) Int. Cl.
*G06Q 30/00* (2023.01)
*G06Q 20/12* (2012.01)
(Continued)

(52) U.S. Cl.
CPC ....... *G06Q 30/0643* (2013.01); *G06Q 20/123* (2013.01); *G06Q 20/3267* (2020.05)

(58) Field of Classification Search
CPC .......... G06Q 30/0643; G06Q 20/3267; G06Q 20/123
See application file for complete search history.

(56) References Cited

U.S. PATENT DOCUMENTS 5,493,677 A 2/1996 Balogh
6,061,057 A * 5/2000 Knowlton .......... G06Q 30/0641
715/744

(Continued)

OTHER PUBLICATIONS

Benzinga: Mama Don't Take My KODAKCoin Away: What Photographers And Crypto ExpertsKodak's ICO Weblog post. Newstex Finance & Accounting Blogs, Newstex. Jan. 11, 2018; Dialog #1986364240 3 pgs.

(Continued)

*Primary Examiner* — Robert M Pond
(74) *Attorney, Agent, or Firm* — K&L Gates LLP

(57) ABSTRACT

A token specifying a payment account is issued to a party to which payments are to be made and the token is installed in a specially configured camera. Whenever a photograph is captured by the camera, a copy of the token, among other things, is embedded in the photograph's metadata. The metadata may also include photo-specific information and a selling price. When a buyer selects the photo for purchase, the token may be used to facilitate a payment to the party, such as the photographer. The buyer may initiate the transaction by simply dragging the selected photograph or photographs onto a purchase application which automatically extracts price and the token for initiating the purchase transaction. The seller can view the purchase details in the payment account.

19 Claims, 6 Drawing Sheets

(51) Int. Cl.
    *G06Q 20/32*     (2012.01)
    *G06Q 30/0601*     (2023.01)

(56) References Cited

U.S. PATENT DOCUMENTS

| | | | |
|---|---|---|---|
| 8,365,081 | B1 | 1/2013 | Amacker |
| 10,762,520 | B2 | 9/2020 | Ericson |
| 11,587,157 | B2 * | 2/2023 | Sen .................... G06Q 30/0643 |
| 2004/0135888 | A1 | 7/2004 | Oakeson |
| 2006/0110154 | A1 | 5/2006 | Hulsen |
| 2007/0229678 | A1 | 10/2007 | Barrus |
| 2010/0277611 | A1 | 11/2010 | Holt |
| 2011/0276479 | A1 | 11/2011 | Thomas |
| 2016/0098708 | A1 | 4/2016 | Loomis |
| 2017/0293914 | A1 | 10/2017 | Girish |
| 2018/0293573 | A1 | 10/2018 | Ortiz |
| 2018/0349938 | A1 | 12/2018 | Ericson |
| 2021/0049675 | A1 | 2/2021 | Sen |

OTHER PUBLICATIONS

Office Action (Final Rejection) dated Aug. 16, 2022 for U.S. Appl. No. 16/979,692 (pp. 1-13).
Office Action (Non-Final Rejection) dated Feb. 17, 2022 for U.S. Appl. No. 16/979,692 (pp. 1-19).
Office Action (Notice of Allowance and Fees Due (PTOL-85)) dated Oct. 18, 2022 for U.S. Appl. No. 16/979,692 (pp. 1-8).
PCT International Search Report and Written Opinion for PCT/US2018/022390 dated May 17, 2018, 16 pages.

* cited by examiner

EMBEDDED PAYMENT TOKENS IN DIGITAL MEDIA OBJECTS

CROSS-REFERENCE TO RELATED APPLICATIONS

This application is a continuation application of U.S. application Ser. No. 16/979,692, filed Sep. 10, 2020, which is a national stage entry under 35 U.S.C. 371 of International Patent Application No. PCT/US2018/022390, filed on Mar. 14, 2018, and designating the United States, the entire contents of which are incorporated herein by reference.

BACKGROUND

The background description provided herein is for the purpose of generally presenting the context of the disclosure. Work of the presently named inventors, to the extent it is described in this background section, as well as aspects of the description that may not otherwise qualify as prior art at the time of filing, are neither expressly nor impliedly admitted as prior art against the present disclosure.

Digital photographs may be readily shared via various electronic mechanisms. However, copyrighted photographs may sold or shared without the owner receiving appropriate payment.

SUMMARY

A customized photo capture device, such as a standalone camera, is provisioned with a payment token in the camera. The payment token is associated with an account to which payments are made when purchasing a photograph. The camera will embed the payment token as metadata in every photograph taken using the camera along with a photo-specific unique identifier and optionally, a price. Any photo agency electing to purchase/use the photograph merely initiates a purchase transaction using the token to identify the recipient account details. The details of the purchase are available to the photographer at the account receiving the payment.

When purchasing a photograph, an agency or other purchaser may only need to drag the photograph onto a payment application to initiate the payment processing. The token may be extracted from the metadata and the purchase may be automatically transacted using the token.

BRIEF DESCRIPTION OF THE DRAWINGS

The figures depict a preferred embodiment for purposes of illustration only. One skilled in the art may readily recognize from the following discussion that alternative embodiments of the structures and methods illustrated herein may be employed without departing from the principles described herein.

DETAILED DESCRIPTION

Figure 1:
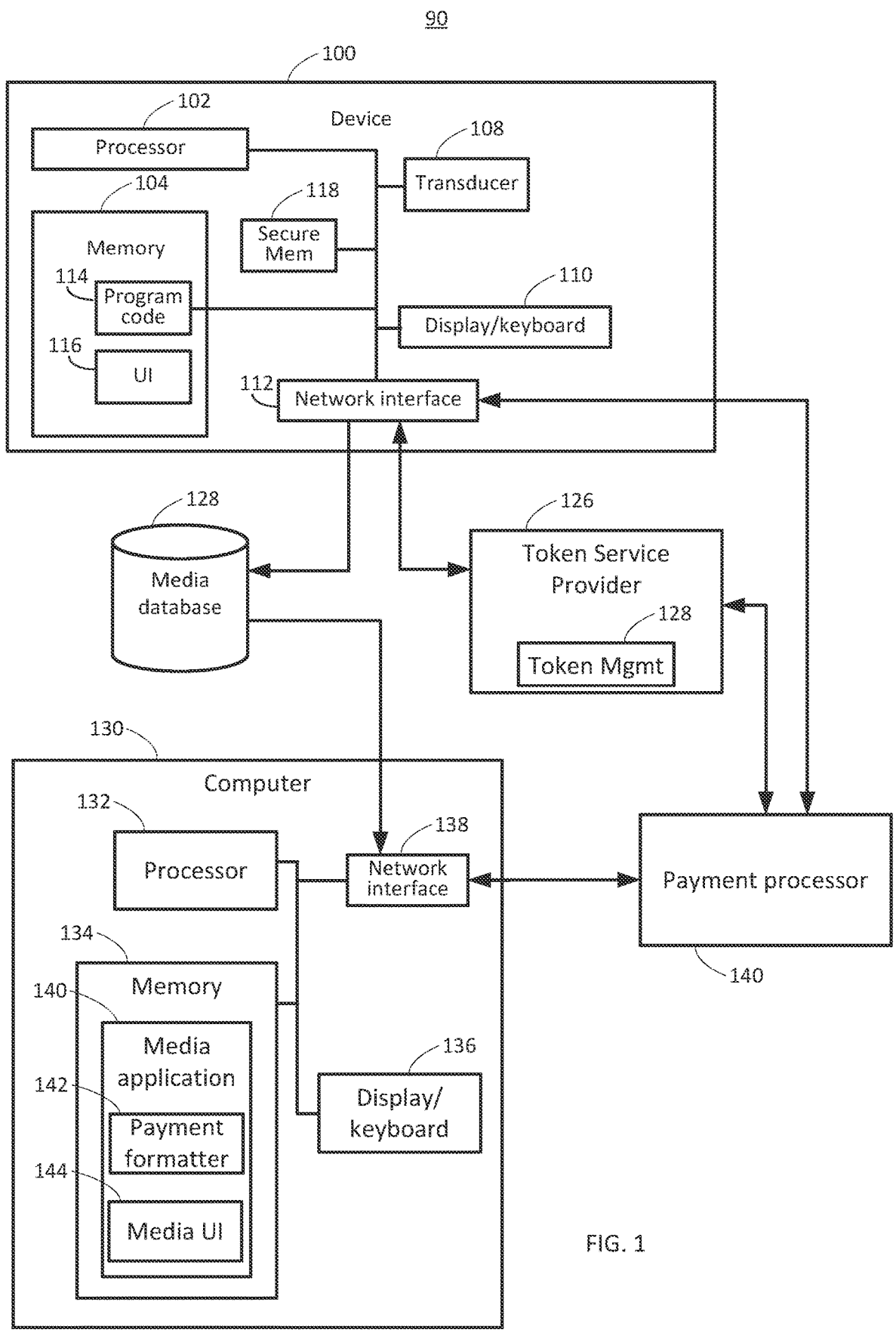
FIG. 1 is a system diagram illustrating system components associated with the use of embedded tokens in digital media objects in accordance with the current disclosure.

A device such as a still camera, video camera, or other recording device assembles a media object including a token as a media item is captured. In an embodiment, the device may include a secure memory for storing the token as well as including special programming for requesting a token and combining metadata including the token with the media item into a media object. The media object in accordance with the disclosure includes everything needed for initiating a payment to a copyright owner (seller) to purchase the media item.

The flow of product distribution of a physical item generally follows a well-known course, a consumer look at the product, determine suitability for the purpose, give the seller funds, and receive the item or service. However, purchasing copyrighted media has posed a problem to this model for some time. Photographs and videos may be posted to a website for review, but a simple purchase transaction may be complicated by the need to know not just what website hosted the media and the copyright owner, but how and to whom to actually make the payment. To further complicate the process, a copyright owner may not wish to share personal account details that could be used to facilitate a purchase.

Tokens are commonly used in payment applications and electronic wallets to conceal a user's actual personal account numbers from disclosure. The token may be issued by a token service provider and used instead of a credit or debit card at a point of sale or for an online purchase. A transaction processor may recognize the token and divert the transaction to the token service provider which substitutes the actual account number for the token for the rest of the transaction approval and clearing process. In some cases, the use of the token may be restricted to certain conditions, such as use at a particular merchant. Tokens may support transactions for both crediting an account and debiting an account, as will be useful in the process described below.

The disclosed system and method may generate a token that is linked to a copyright owner's personal account number. The token may be attached to an individual media item at the time the media item, e.g., a photograph or video, is captured. The token may then be used by a payment processor during a purchase transaction to retrieve actual payment account details and complete the purchase. By including the token in the media object itself, as well as relevant metadata such as price, copyright, and media details, the media object carries all the necessary information required to buy rights for the media object without relying on an intermediary to broker the transaction. This vastly simplifies the purchase process because each media object is fully self-described, with the purchase information embedded, not simply referenced. By using this technique, the risk of selecting one object and receiving a different object is reduced because a broker website does not have to match the media object to a separate payment transaction. In one embodiment, the selection is made by dragging a media object onto a payment application which then extracts the token and any other relevant information for initiating the payment/purchase.

In an example, where stock media "warehouses" may include tens of thousands of media selections, the complexity for the management and accounting of such warehouses may be reduced significantly. Apart from stock media applications, the advantages of the embedded token technique may extend to small studio and individual content producers who no longer need to track price sheets and complicated sales processes.

FIG. 1 is a block diagram illustrating a system 90 for the creation and use of embedded tokens in media objects. The system 90 may include a device 100, a token service provider 126, a media database 128, a computer 130 used by a purchaser of a media item, and a payment processor 140. The device 100 may include a processor 102 and memory 104 coupled by a data bus to other device components such as a secure memory 118, a transducer 108, and a display/data input 110. The device 100 may also include a network interface 112.

The memory 104 may include one or more types of physical memory including RAM, ROM, flash memory, rotating media, etc., but does not include transitory memories such as carrier wave or propagated media. The memory 104 may include an operating system (not depicted), executable programs 114, and utilities, such as a user interface (UI) 116. The program code 114 may include applications and drivers to interface with the transducer 108 to receive and store media items. In various embodiments, the transducer 108 may be a camera supporting capture of still frame images and video. In another embodiment, the transducer 108 may be a microphone or an array of microphones for capturing audio.

The secure memory 118 may be used to store a token so that only authorized applications or specific functions can access the token. Further, special permissions may be required to store a new token in the secure memory to limit the possibility that a rogue token is placed into the secure memory 118. For example, a user may be required to enter a password or pass a biometric test when a new token is added to the secure memory. In other embodiments, the token may be stored in the regular memory 104.

The display/keyboard 110 may be a traditional keyboard or keypad in addition to a display. In an embodiment such as a camera, the display may be used instead of or to supplement an optical eyepiece for aiming the camera or may be used to review photographs or videos that have already been captured. In such an embodiment, the keyboard/keypad may include keys or functions for setting exposures, scrolling through images, etc. In another embodiment, the device 100 may be a smartphone and the display/keyboard may include a display with a touchscreen used to implement a soft keyboard. Other configurations may be supported including, but not limited to, a tablet, a laptop, or an audio recorder.

The network interface 112 may provide data connectivity to external entities. The network interface 112 may support a variety of wired and wireless networks including, but not limited to Ethernet, universal serial bus (USB), Bluetooth®, or any of a number of IEEE 802.11 protocols. The network interface 112 may support discovery, caching, error handling, encryption, or other elements of inter-device communication.

Figure 2:
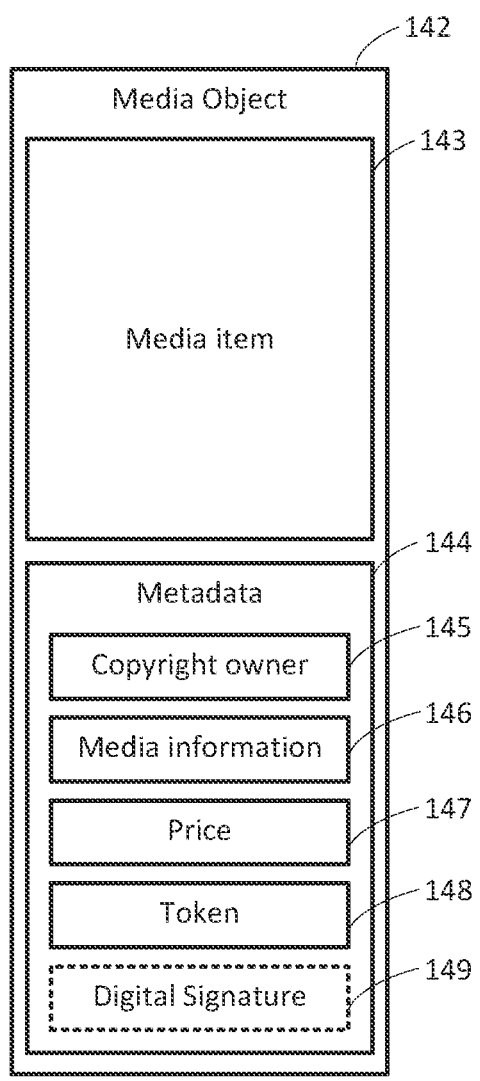
FIG. 2 is an block diagram of an embodiment of digital media object in accordance with the current disclosure.

In operation, the device may capture a media item and process the media item into a media object. Turning briefly, to FIG. 2, one embodiment of the format of a media object 142 is discussed. The media object may be a combination of a media item 143 and metadata 144. The media item 143 may be a photograph in any of a number of formats from raw data to a compressed form such as a JPEG file. The media item 143 may be a video file such as an MPEG file or other video format. In another embodiment, the media file may be an audio file following an MP3 or other audio compression scheme. Other possible storage formats will be apparent to those familiar with digital media.

The metadata 144 may include the information illustrated in FIG. 2 or may include more or less information based on the application and/or the sales marketplace. As shown, information about a copyright owner 145, photographer, studio, etc., may be included in the metadata 144 as well as media information 146 such as date and time of capture, location, capture settings (e.g. exposure information), information about the device 100, and/or other relevant data.

A price 147 may be added to the metadata 144 as explained in more detail below. A token 148 may be included in the metadata 144 to bind the media item 143 to the copyright owner or other party to which payment needs to be made when purchasing the media item 143/media object 142. In some embodiments, a digital signature 149 may be included in the metadata 144 to help ensure that the media object 142 is not tampered. For example, a hash of the media object may be signed by a private key of the copyright owner and included as the digital signature 149. A third party may decrypt the hash value using the copyright owner's public key and confirm a match with a currently calculated value.

The metadata 144 may take several forms. For example, in a photograph, an Extensible Metadata Platform format for metadata may be followed to allow the use of user-created tags to include the token information. In another embodiment, an Interchange Model using an XMP format may be used.

Returning to FIG. 1, when a device 100 is being configured for use in the described manner, the copyright owner, device owner, or party to whom payments are to be made (hereafter, copyright owner) may request a token 147 from a token service provider 126. The request may include a personal account number (PAN) of the copyright owner, the PAN representing the account to which payments will be made. The token service provider 126 may then generate a new token 147 via a token management function 128, for example, following an ISO 7812 numbering standard. The token 147 may be returned to the device 100 and, in an embodiment, installed in the secure memory 118. In some cases, a token requester (not depicted) may act as an intermediary in the token generation process. For example, the issuer associated with the particular account/PAN may receive the request from the device 100 and interact with the token service provider 126 to request and receive the token 147.

When a media item 143 is captured, some information such as the copyright owner 145, media information 146, and token 148 may be automatically added to the metadata 144. In an embodiment, program code 114 may use user interface utilities 116 to provide an opportunity for a device user to manually add a price 147 to the metadata. In other embodiments, a default price may be added to the metadata and the user may alter the price if a change is desired. Optionally, the digital signature 149 may be generated and added to the metadata 144. When used, the digital signature 149 may also be automatically generated and added to the metadata based on a preference setting and the availability of a digital certificate for access to the user's private key.

Figure 3:
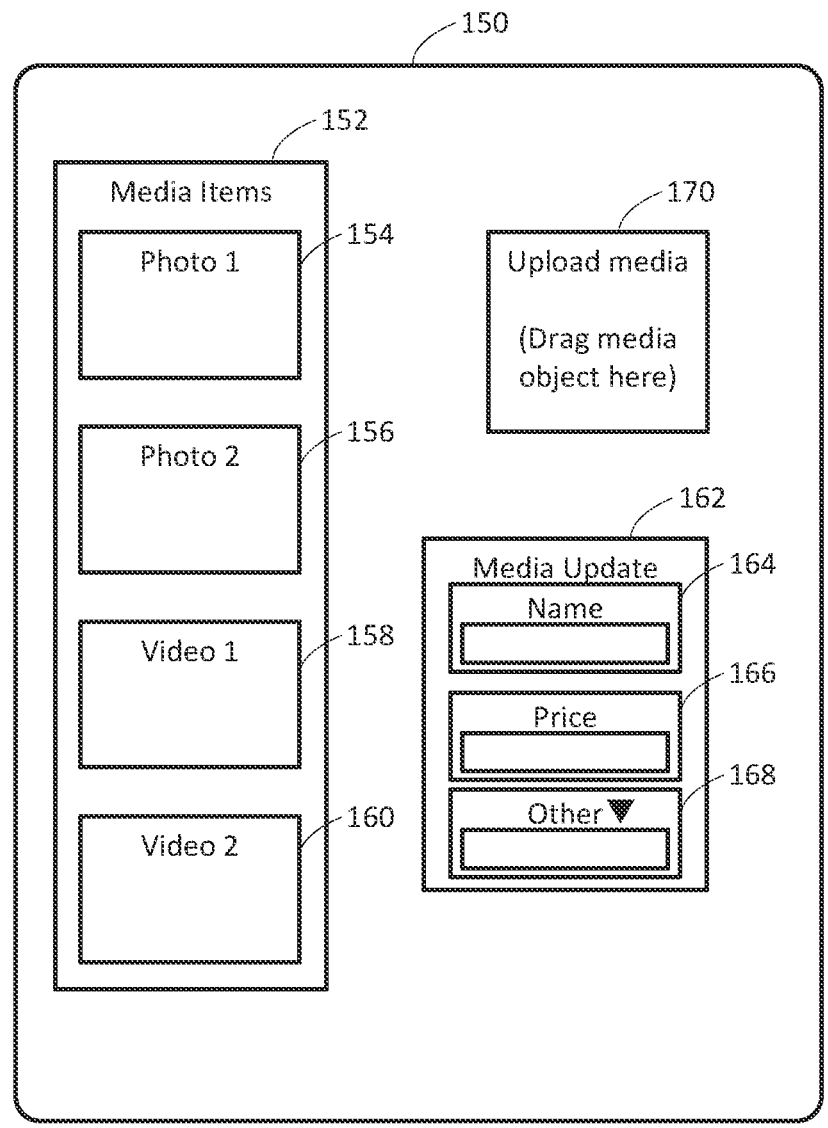
FIG. 3 is an exemplary user interface of a media capture device.

An exemplary user interface 150 for the device 100 as relevant to creation of the media object 142 may be illustrated at FIG. 3. In this illustration, the UI 150 may include a window 152 for display of one or more media items 154, 156, 158, 160. In the case of a camera, the media items 152 may include images 154, 156, or videos 158, 160 or both. An information window 162 may allow the device user to use a name field 164, price field 166, or other field 168 to input information for inclusion in the metadata 144 of the media object 142. In an embodiment, one or more selected media items 152 may be dragged to a media upload window 170 to upload the media objects 150 to the media database 128. In different embodiments, the media objects 142 may be created as the media item 143 is captured, with updates as needed for new data, such as price 147 or the media object 142 may be created from the media item 143 and stored information after the media item 143 has been identified for uploading or during in a lull in activity. This latter process may save on overhead at a time when media items are being captured so that media capture throughput is not hindered by the media object creation process.

Returning to FIG. 1, after the media object 142 is created, the media object 142 may be shared to a media database 128. The media database 128 may be publicly accessible or may be available only to a limited group, such as subscribers to a media sharing group.

A third party, such as an agency looking for a stock photo may access the media database 128 from a computer 130 or other connected platform such as a tablet or smartphone. The computer 130 may include a processor 132 and memory 134. A display and keyboard 136 may support a user interface such as that illustrated in FIG. 4. The display/keyboard 136 may also include a pointing device such as a mouse or may have a touchscreen interface, or a combination of these or other hardware features.

Figure 4:
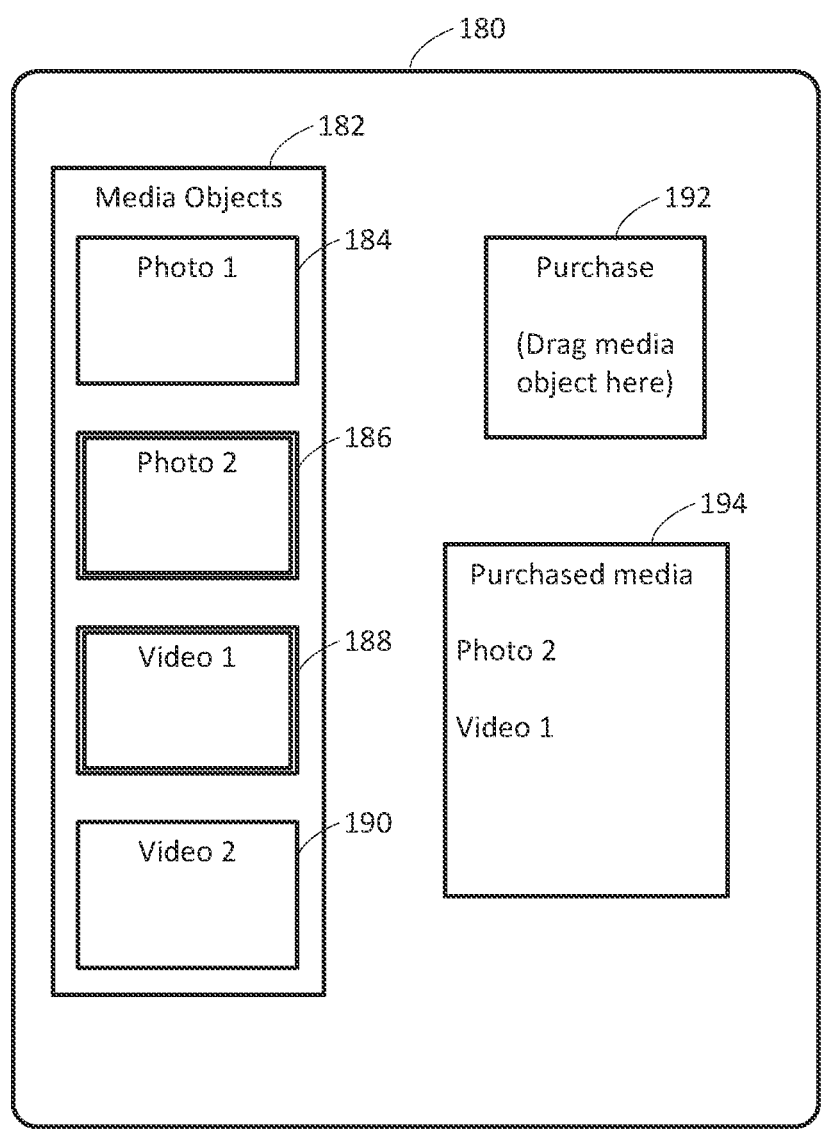
FIG. 4 is an exemplary user interface of a media purchase computer.

The computer may retrieve one or more media objects 142 from the media database 128 via a network interface 138, which may be the same as or similar to the network interface 112 of the device 100. Turning now to FIG. 4, one embodiment of a user interface may be depicted. One or more media objects 182 or corresponding thumbnail representations may be stored in the memory 134 and displayed via a media application 140. Specifically, a media user interface 144 may cause individual media items 184, 186, 188, 190 to be displayed in a media object window 182. Selected media items may be dragged to a purchase window 192 to cause the payment process to automatically launch, as discussed more below. While the drag and drop method of purchase may be convenient, other techniques for indicating a selection for purchase will be apparent. A summary window 194 may illustrate media objects that have already been purchased. In an embodiment, the purchase of a media object may be shown by highlighting its display in the media objects window 182, as shown for media objects 186 and 188.

Returning again to FIG. 1, when one or a selection of media objects 184 is made, the media application 140 may use a payment formatter 142 to extract the token from the media object 182 and initiate a purchase transaction by receiving (or retrieving from the memory 134) a personal account number (PAN) of the purchaser. In an embodiment, the PAN of the purchaser may also be represented by a token (purchaser token). The purchaser token and the token 148 (sellers token) from the media object 184 may be formatted into a normal purchase transaction, using for example, an ISO 8583 interchange message. The formatted message may be transmitted via the network interface 138 to a payment processor 140. The payment processor may interact with the token service provider 126 to retrieve the seller's actual PAN and then continue the transaction by getting an approval from the buyer's bank or card issuer.

In various embodiments, the computer 130 may be an end user computer or may be a server hosting the media application 134. In the latter case, the media database 128 may be affiliated with an owner of the computer 130, for example, the computer 130 and the media database 128 may be owned and operated by an agency.

The computer 130 may also have a secure memory (not depicted) for storing one or more PANs or tokens associated with an agency, an end purchaser, or both.

Once the transaction has reached the processor 140, the transaction follows the normal rails for processing including settlement with purchaser's issuer or financial institution. In an embodiment, the processor 140 may send the seller a notification that a transaction has been initiated. At any point, the seller may check the account associated with the PAN/token 148 to view sales revenues.

Figure 5:
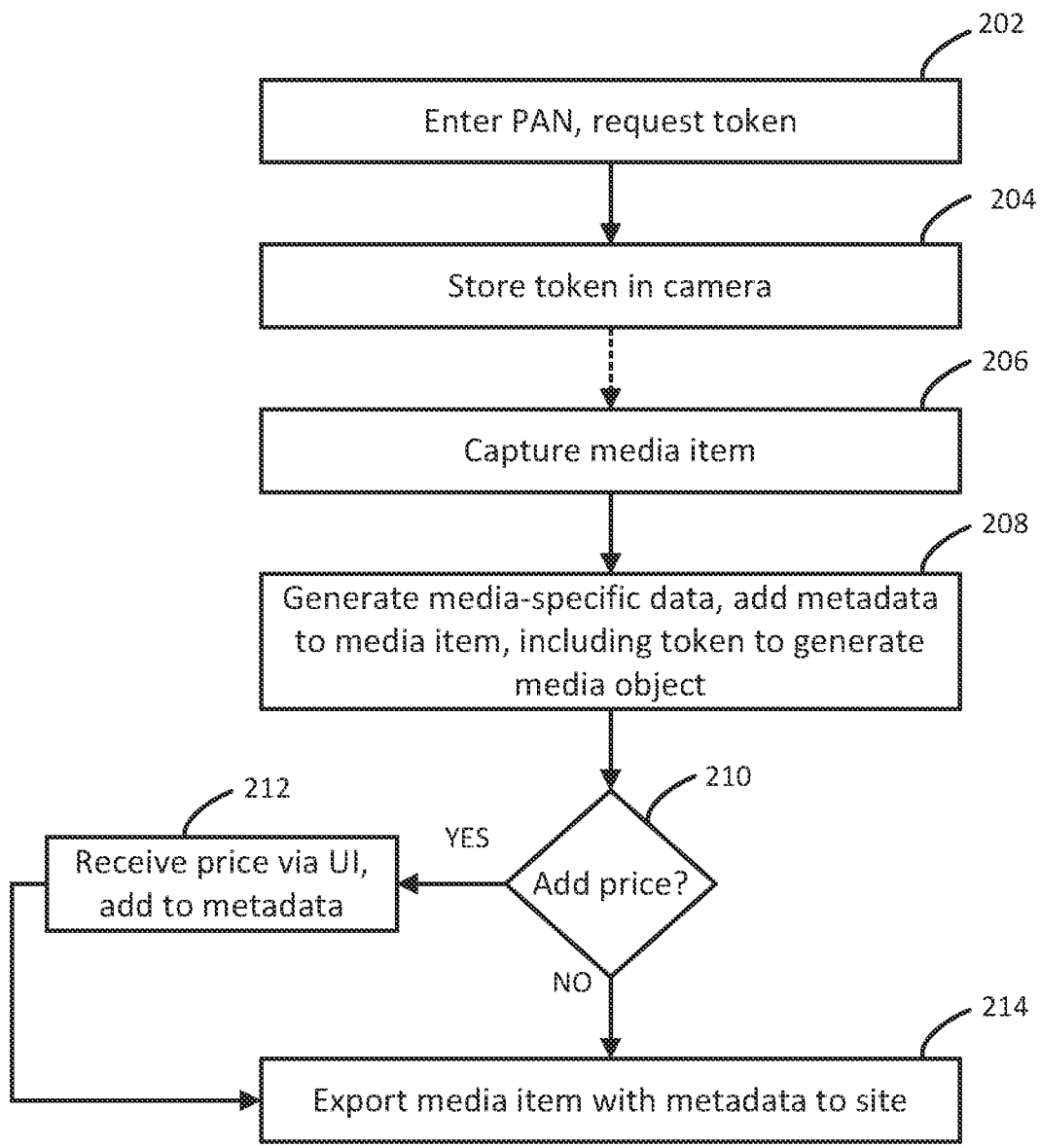
FIG. 5 is a flowchart of a method of creating and exporting a digital media with an embedded token.

FIG. 5 is a flowchart of a method 200 of capturing and exporting a media item 143. At block 202, a request for a token 148 may be entered using a user interface application 116 of a device 100. The UI 116 may prompt for and receive a personal account number (PAN) of a copyright owner (seller). After the PAN is captured, a request for a token may be made to a token service provider 126, either directly or through an intermediary such as an issuer operating as an authorized token requester. When the token has been returned, the device 100 may store the token 148 in a secure memory 118 at block 204.

Subsequent to receiving and storing the token, at block 206, the device 100 may capture a media item 143. The media item 143 may be an image, a video, an audio recording, or another media type, such as, but not limited to a multimedia presentation, the media item 143 may be stored in the memory 104 of the device 100.

At block 208, a program 114, perhaps in conjunction with UI code 116, may attach various metadata 144 to the media item 143 to create a media object 142. The metadata may include information as discussed above such as owner information 145 and media information 146. At block 210, an operator of the device 100 may wish to add a price 147 or update an automatically included default price. If so, execution continues at block 212 where the operator may be presented with a UI 150 including a window 162 for entering the new or updated price, as well as other relevant data if desired.

If no price updates to be made at block 210 or after adding pricing information at block 212, execution may continue at block 214 where the media object 142 may be uploaded to a media database 128 or other outlet or marketplace.

Figure 6:
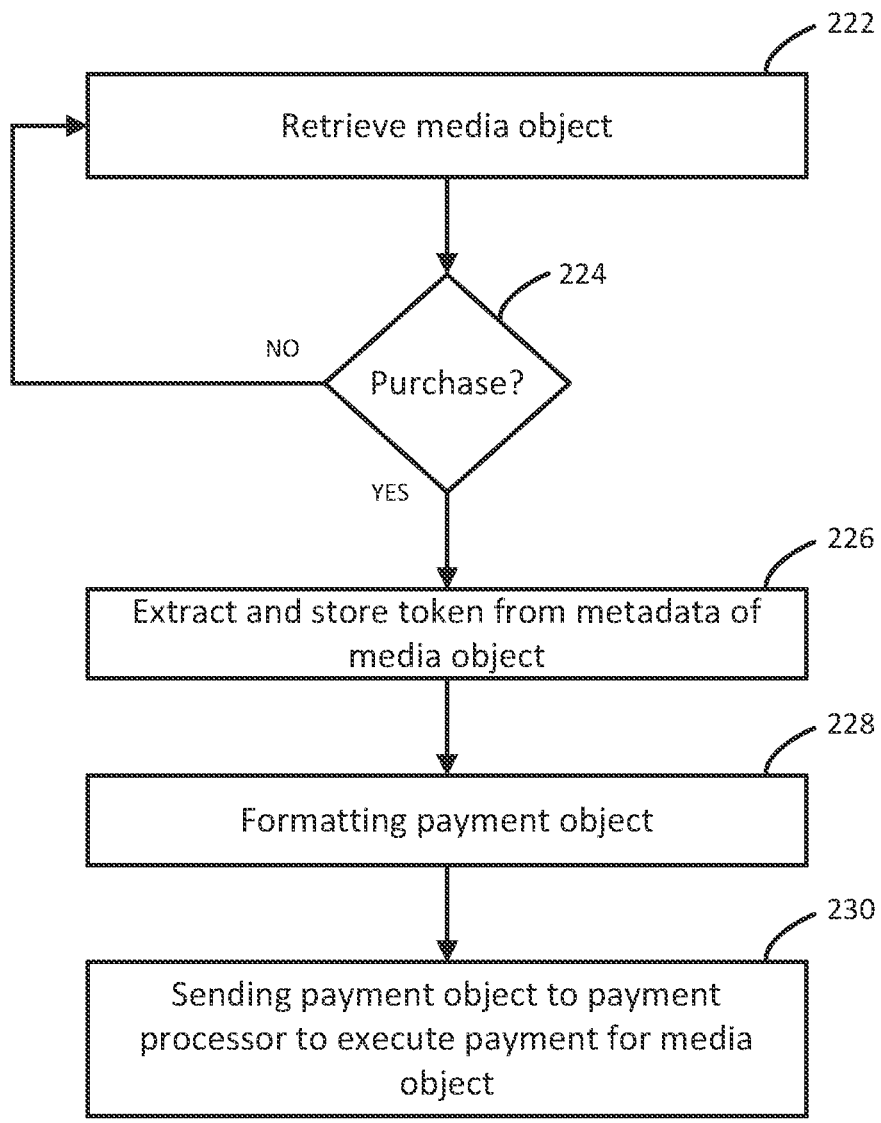
FIG. 6 is a flowchart of a method of purchasing a digital media object with an embedded token.

FIG. 6 is a flowchart of an exemplary method 220 of distributing a media object 142 with an embedded token 148. A user accessing a computer 130 either directly or via a web page may review and retrieve the media object 142 or a thumbnail of the media item 143 from the media database 128. At block 224, a decision may be made whether to purchase the media object 142. If no action is taken by the user, another selection may be made, indicated by a return to block 222. If yes, a purchase decision may be detected in an number of ways. In an embodiment, a user interface application may detect movement of the media object 142 onto a purchase window 192 of the media application 140 (i.e., drag and drop). In other embodiments, the purchase decision may be detected in another fashion, such as an "add to cart" button.

At block 226, the media application 134 may extract and optionally store the token 148 from the media object metadata 144. The token 148 may be combined with buyer account details so that at block 228 a payment object may be generated that may be submitted as a payment transaction to a merchant acquirer or other payment processor 140 at block 230. Processing of the payment transaction may follow normal rails including authentication, approval by an issuer, and settlement to the copyright owner's account. The copyright owner may view the transaction details for transaction virtually instantly compared to perhaps a month-long wait for a traditional transaction posting through a third party media service.

In an embodiment, the buyer's transaction receipt may include an identifier of the media object that can be used for rights verification for copyrighted material when required. Digital rights management (DRM) of media objects is not discussed here, but the combination of the disclosed techniques for authenticated purchases with watermark removal, decryption, de-blurring, expiration dates, etc. are straightforward.

The technical effect disclosed is the addition to a standard media device of a secure memory and programming that cause the device 100 to automatically attach a token to each media item 143 so that the object created includes full details needed for a purchase transaction. This is a technical solution to a technology problem created by the current anonymity of digital media even as full details may be available for lens type, exposure settings, and location. Modification of the device 100 to automatically attach the token alleviates the user from additional post-processing such as manually entering data so that media objects are identifiable from the moment they leave the device 100.

The use of an embedded token in a media object 142 benefits both purchasers and copyright owners (sellers). A purchaser does not have to guess where and how to make a payment for a selected item. A copyright owner can create media objects with tokens without any additional processing. The use of a token 148 may protect the copyright owner's identity and accounts while allowing funds for purchase of the media object 142 to be directly credited to the copyright owner without passing through a third party reseller.

The figures depict preferred embodiments for purposes of illustration only. One skilled in the art will readily recognize from the following discussion that alternative embodiments of the structures and methods illustrated herein may be employed without departing from the principles described herein Upon reading this disclosure, those of skill in the art will appreciate still additional alternative structural and functional designs for the systems and methods described herein through the disclosed principles herein. Thus, while particular embodiments and applications have been illustrated and described, it is to be understood that the disclosed embodiments are not limited to the precise construction and components disclosed herein. Various modifications, changes and variations, which will be apparent to those skilled in the art, may be made in the arrangement, operation and details of the systems and methods disclosed herein without departing from the spirit and scope defined in any appended claims.

The invention claimed is:

1. A method of capturing and distributing a media object, the method comprising:
   receiving, via a user interface of a device, a payment token associated with a payee;
   requesting, via the user interface of the device, the token via a communication with a token service;
   storing the payment token in a secure memory of the device;
   storing a media object in a memory of the device separate from the secure memory, the media object including a media item and metadata;
   adding the payment token and a price to the metadata; and
   exporting the media object to a site accessible to third parties.

2. The method of claim 1, wherein requesting the token further comprises:
   receiving, via the user interface of the device, a personal account number (PAN) of the payee; and
   sending the PAN to the token service.

3. The method of claim 1 further comprising capturing a media item with the device.

4. The method of claim 3, wherein the payment token is associated with the media item.

5. The method of claim 1 further comprising:
   retrieving, at a computer, the media object; extracting the payment token from the media object;
   generating a payment object using data from the payment token; and sending the payment object to a payment processor.

6. The method of claim 5, wherein generating the payment object comprises:
   receiving a user interface command causing the movement of the media object onto an icon of a payment application;
   extracting, via the payment application, the payment token from the media object; and
   formatting the payment object, via the payment application, using information stored in the payment token.

7. The method of claim 1, wherein the metadata includes at least a date and time that the media item was captured.

8. The method of claim 1, wherein the media item is at least one of a digital image, a digital video, or a sound recording.

9. The method of claim 1, wherein the media item was captured by the device.

10. The method of claim 1, wherein the metadata follows an extensible metadata platform (XMP) format.

11. A method of distributing a media object, the method comprising:
    retrieving, at a computer, a media object from a site, the media object including:
       a media item,
       a payment token, wherein the payment token conceals a personal account number of a copyright owner of the media item, and
       a price associated with the media item;
    presenting, by the computer, the media object on a user interface;
    detecting, by the computer, movement of the media object onto an icon of a payment application;
    extracting, via the computer, the payment token from the media object;
    generating a payment object using data from the payment token; and
    sending the payment object to a payment processor via the payment application.

12. The method of claim 11, wherein generating the payment object includes formatting the payment object via the payment application using the payment token.

13. The method of claim 11, wherein the payment token is associated with a payee associated with the media item.

14. The method of claim 11, wherein the media item is associated with a payee of the payment token.

15. A method of providing a payment token, the method comprising:
    receiving, at a token server, a token request from a device associated with a user, the request including a personal account number (PAN) of the user;

in response to the token request, generating, by the token server, a new payment token;

transmitting the new payment token to the device for installation into a secure memory of the device and for adding to metadata of a media item;

receiving, from a payment processor, the media item from a media database uploaded by the device associated with the user, wherein the media item comprises the metadata and the new payment token; and in response to receiving the new payment token from the payment processor:
  identifying the PAN of the user based on the new payment token, and
  transmitting the PAN to the payment processor for completing a transaction associated with the media item.

16. The method of claim 15, wherein the new payment token follows an ISO numbering standard.

17. The method of claim 15, wherein the new payment token is extracted from a media object including the media item and the new payment token.

18. The method of claim 16, wherein the extraction of the payment token is performed using a payment formatter.

19. The method of claim 15, wherein the PAN represents a user account to which payments will be made for the media item.

* * * * *